Dec. 13, 1966 W. B. GILES ET AL 3,290,883
DRAG REDUCTION IN HYDRAULIC EQUIPMENT
Filed April 29, 1965

Inventors:
Walter B. Giles,
Hansjoerg Stern,
by Paul A. Frank
Their Attorney.

United States Patent Office 3,290,883
Patented Dec. 13, 1966

3,290,883
DRAG REDUCTION IN HYDRAULIC EQUIPMENT

Walter B. Giles and Hansjoerg Stern, Scotia, N.Y., assignors to General Electric Company, a corporation of New York Filed Apr. 29, 1965, Ser. No. 451,951
10 Claims. (Cl. 60—55)

This invention relates to a method of increasing the efficiency of hydraulic machinery and systems, and more particularly, to a method of increasing the efficiency of hydraulic turbines, pumps and related equipment by reducing frictional drag losses therein.

In turbines, pumps and other hydraulic machinery, as for example those used in hydroelectric power generation, peak operating efficiency is limited due to frictional losses in the flow through the machinery. Large machines operating at low rotative speeds and low water velocities minimize the frictional losses somewhat, but substantially increase the size of the machinery and therefore the capital investment. The need then arises for a method of substantially increasing the efficiency of presently available hydraulic equipment, including turbines and pumps without increasing the capital investment. Our invention envisions a method of adding viscoelastic drag reducing materials to the flow stream passing through turbines, pumps and other hydraulic machinery to substantially decrease frictional losses therein and thereby substantially increase the efficiency of the equipment.

The chief object of our invention is an improved method of increasing the efficiency of hydraulic equipment.

Another object of our invention is a method and apparatus for reducing frictional drag in hydraulic turbines, pumps and related equipment and thereby substantially increasing the efficiency thereof.

A further object of our invention is a method for recirculating drag reducing material through a system for increasing the efficiency of the system.

These and other objects of our invention will be more readily perceived from the description which follows.

In carrying out the objects of our invention, we provide a method of substantially increasing the efficiency of hydraulic equipment by adding a viscoelastic drag reducing material comprising a water soluble, linear, high molecular weight, polymer at a point in the flow stream so that the material passes through the machinery to reduce the frictional drag in the equipment and substantially increase the efficiency. In a closed system, the material is added in a manner such that it constantly recirculates through the system to continue to reduce frictional loss with each pass. Additionally, recirculation apparatus may be built into the machinery to reuse and thereby conserve the amount of drag reducing material employed.

The attached drawing illustrates embodiments of our invention in which

Our invention envisions the adding of a drag reducing material to the flow stream of hydraulic systems, especially machinery such as turbines and related equipment, to reduce frictional drag and increase the efficiency of the system. Materials that are especially suitable for drag reduction appear to fall in certain specific categories. They are viscoelastic polymers having the following characteristics: a high polarity, water solubility, high molecular weight and a high hydrogen bond forming capability. Also, significantly they are very long, having a high linearity with few side branches and thereby an extremely large length to diameter ratio of the molecules. The linearity appears to establish a certain linking between the long molecules to produce laminar flow and thereby substantially reduce turbulent flow in the system. Laminar flow produces relatively low frictional drag through the hydraulic equipment, and thus substantially increases the efficiency. Solubility and high molecular weight are also important for effective dissolution of the drag reducing material in the water to achieve the desired drag reduction. Some materials that work particularly well are Guar Gum, Locust Bean Gum, carrageenan or Irish moss, Gum Karaya, hydroxyethyl cellulose, sodium carboxymethyl-cellulose, polyethylene oxide, polyacryamide and polyvinylpyrrolidone. These mamaterials are exemplary of substances exhibiting the above characteristics and thus work especially well in reducing drag in hydraulic systems. The drag reducing materials are premixed with water to hydrolize them and then injected into the boundary layer of hydraulic machinery surfaces at points such as feed tunnels, guide vanes, nozzles, diffuser walls, runner blades, draft tubes and on rotation disk surfaces. The surfaces are then enveloped by the hydrolized drag reducing material to achieve 75 to 90% reduction of skin frictional drag and thereby a substantial increase in the efficiency of the machinery.

Figure 1:
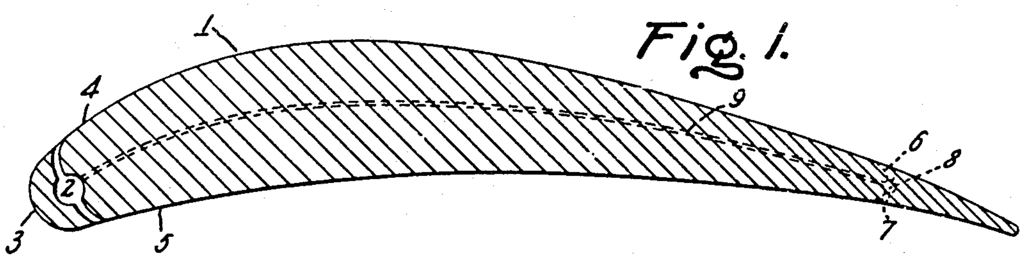
FIGURE 1 is a cross-sectional view of a turbine blade employing our invention.

A typical example of the use of our drag reducing method on hydraulic machinery and more specifically on a turbine blade is shown in FIGURE 1. The drag reducing material is stored in chamber 2 located toward forward or leading edge 3 of turbine blade 1. The material then flows out tubes 4 and 5 and along the upper and lower edges, respectively, of blade 1 to substantially reduce frictional drag. Alternatively, duct 6 on upper surface 4 and duct 7 on lower surface 5, proximate the trailing edge of turbine blade 1, are provided to entrap a substantial portion of the drag reducing material that passes over surfaces 4 and 5 and transfer it to container 8 where it is pumped through a suitable tube 9 passing through the blade to recirculate the drag reducing material for maximum effective use thereof. Very often a few passes of the drag reducing material are needed before it is properly in solution so that maximum efficiency may be obtained. A way is thus provided for reducing drag by employing recirculation that makes maximum use of the drag reducing materials. It will be appreciated that the drag reduction technique of the persent invention may be employed to reduce drag in other parts of hydraulic equipment, namely guide vanes, nozzles or diffusers, and is not limited to turbine blades.

In hydroelectric installations employing pumps and turbines, the available power is prescribed by the elevation change and flow rate as determined by the size of the dam and water shed for the particular site. Presently, in selecting a turbine to meet the fixed requirements of elevation and flow rate, the engineer is forced to accept certain efficiencies without any possibility of altering them. With the use of drag reducing materials and with the flow rate and elevation change prescribed, a greater efficiency with the same equipment may be obtained, thus adding flexibility to the choice of a pump or turbine for a particular installation. Drag reducing materials decrease the frictional losses in a pump or turbine, so that far greater efficiency or far greater speeds than were possible before are now obtainable. Therefore, because of the greatly increased efficiency, the size of the machine can be substantially changed to reduce capital investment and obtain the same power output as before or, on the other hand, the same machine can be designed as before with a far greater power output.

Figure 2:
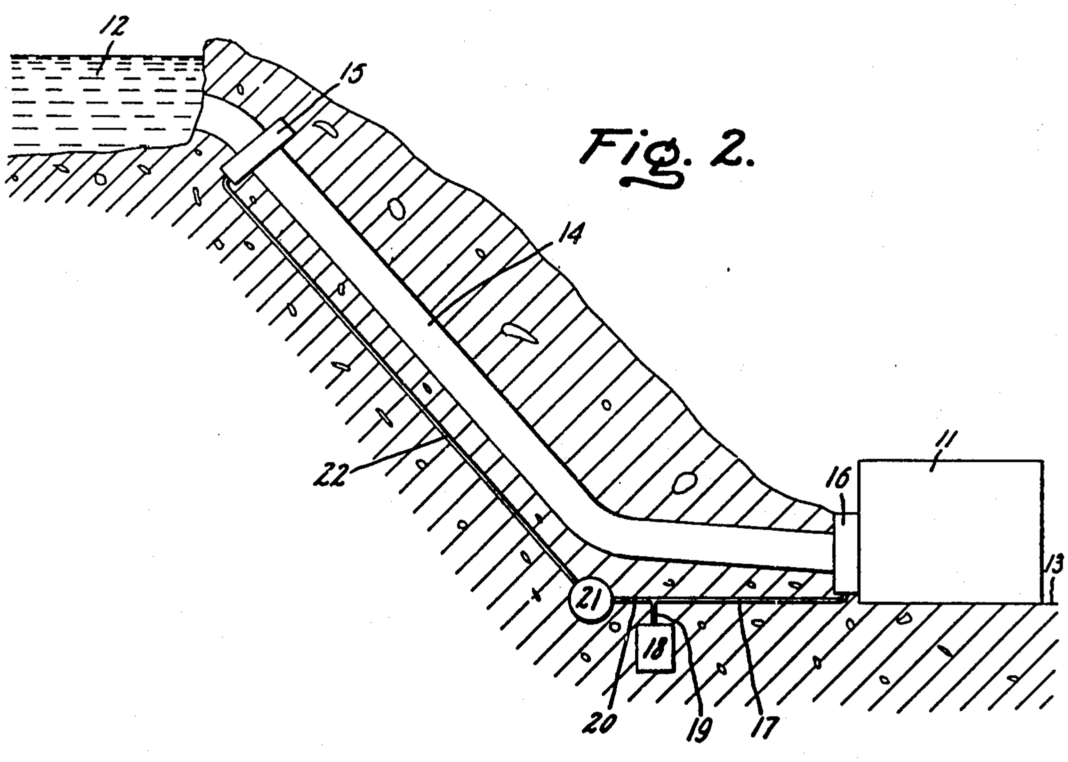
FIGURE 2 is a view of a hydroelectric power plant employing our drag reducing invention.

In hydroelectric plants, such as the one illustrated in FIGURE 2, two reservoirs, an upper 12 and lower one 13 are used. The system is referred to as recirculation or pump storage system because energy is stored during off-peak load periods in reservoir 12 and is recovered during peak load periods by returning the water to lower reservoir 13 through turbine 11. If such a system is completely closed, the drag reducing material is mixed into the water and continually recycled therethrough, with only a slight loss thereof. Thus, once the material is put into the system, drag reduction and thus high efficiency is maintained with only a slight addition of drag reducing material as needed.

Recirculation may also be provided in a hydroelectric plant where a closed system is not employed, as also shown in FIGURE 2. Water passes from storage container 18 through tubes 19 and 20 into pump 21 to be transferred through tube 22 and into distributor collar 15 surrounding main transfer tube 14. Water from upper reservoir 12 passes through tube 14 to drive turbine 11 as it is transferred to reservoir 13. As water travels through pipe 14, drag reducing material is added thereto through collar 15 to substantially reduce frictional drag along the inner walls of pipe 14. The additive is then extracted through collar 16 which has a retracting duct like duct 6 shown in FIGURE 1, just before the water enters turbine 11 and passes through pipe 17 to be recycled through the system. The duct goes about the pipe within the collar so as to extract a maximum amount of additive. As with the aforementioned modes, recirculation of drag reducing materials substantially reduces the amount of material needed for maximum efficiency thereof. It is noted that optimum results may be obtained by controlling the quantity of material added so that maximum use is made thereof.

Various ways have been described for employing drag reducing materials to substantially reduce frictional drag in hydraulic systems including pumps, turbines and related equipment and thereby provide a substantial increase in efficiency thereof.

It will be apparent from the foregoing that our invention attains the objectives set forth. The method embodying our invention is easily adapted to a multitude of hydraulic machinery situations whereby frictional drag is substantially reduced and thereby efficiency of the machinery substantially increased.

Specific embodiments of our invention have been described but the invention is not limited thereto since many modifications may be made by one skilled in the art and the appended claims are intended to cover all such modifications as fall within the true spirit and scope of our invention.

What we claim as new and desire to secure by Letters Patent of the United States is:

1. A method of reducing frictional drag in hydraulic systems comprising the steps of
   adding a viscoelastic, water soluble, linear, high molecular weight, polymer to the flow stream before it enters the equipment so that in passing therethrough it will substantially reduce frictional drag therein, and
   recirculating a portion of the polymer that passes through the system to make maximum use thereof.

2. A method of reducing frictional drag in hydraulic machinery comprising the steps of
   injecting a viscoelastic, water soluble, linear, highly polar, high molecular weight drag reducing polymer into the flow stream passing through hydraulic machinery to reduce frictional losses therein as it passes through,
   extracting a portion of the drag reducing polymer, and
   recirculating the extracted portion through the machinery to make more effective use of the drag reducing polymer by having a larger percentage of the polymer in solution.

3. A method of reducing frictional drag in turbines comprising the step of
   injecting a drag reducing material comprising a viscoelastic, water soluble, linear polymer at a leading edge of a turbine blade so that the material flows in a laminar manner over the surface of the turbine blade to reduce frictional drag thereon and substantially increase the efficiency of the turbine.

4. A method of reducing frictional drag in turbines comprising the steps of
   adding a drag reducing material comprising a viscoelastic, water soluble, linear polymer at a leading edge of a turbine blade so that the material flows in a laminar manner over the surface of the blade to reduce frictional drag thereon,
   recovering a portion of the drag reducing material at the trailing edge of the turbine blade, and
   recirculating the recovered portion of the material through the turbine blade and over the surface thereof to make more efficient use of the drag reducing material.

5. A method of reducing frictional drag in hydroelectric power plants comprising the steps of
   adding a drag reducing material comprising a viscoelastic, water soluble, linear polymer at a point in the power plant so that it constantly recirculates therethrough to substantially reduce drag in the power plant and increase the efficiency thereof.

6. A method of reducing frictional drag in hydroelectric power plants having an upper and lower reservoir comprising the steps of
   injecting a drag reducing material comprising a viscoelastic, water soluble, linear polymer to the flow stream between the upper and lower reservoir to substantially reduce drag in the flow stream therebetween,
   recovering a portion of the drag reducing material before the flow stream travels into the lower reservoir, and
   pumping the recovered portion of the material back into the flow stream to make more effective use of the drag reducing material.

7. A method of reducing frictional drag in hydroelectric power generation systems having an upper and lower reservoir and a turbine therebetween comprising the steps of
   adding a drag reducing material comprising a viscoelastic, water soluble, linear polymer to the flow stream proximate the upper reservoir so that the material substantially reduces drag throughout the flow stream between the upper reservoir and the turbine,
   recovering a portion of the drag reducing material proximate the turbine, and
   recirculating the recovered portion of the drag reducing material back into the flow stream at the same point where it was added before to make more effective use of the drag reducing material.

8. An apparatus for reducing frictional drag in turbines comprising
   injection means for adding a drag reducing material comprising a viscoelastic polymer having a high polarity, water solubility, a high molecular weight and a high linearity to the flow stream through a turbine, to substantially reduce drag and increase the efficiency of the turbine.

9. An apparatus for reducing frictional drag in turbines comprising
   injection means positioned proximate the leading edge of a turbine blade for adding a drag reducing material comprising a viscoelastic, water soluble, linear polymer to the flow stream over the blade to reduce frictional drag thereon, receiving means positioned at a trailing edge of the turbine blade to recover a portion of the drag reducing material, and recirculating means for transmitting the recovered portion of the drag reducing material to the injection means for increasing the efficiency thereof.

10. An apparatus for reducing frictional drag in hydroelectric power generation systems having an upper and lower reservoir comprising injection means for adding a linear, viscoelastic, water soluble polymer to a flow stream between the upper and lower reservoir to reduce drag in the flow stream therebetween, receiving means for recovering a portion of the drag reducing material, and recirculating means for returning the recovered portion of the drag reducing material to the injection means to increase the effectiveness of the drag reducing material.

References Cited by the Examiner

UNITED STATES PATENTS

| | | | |
|---|---|---|---|
| 1,851,513 | 3/1932 | Holmstrom | 170—17[illegible] X |
| 2,540,991 | 2/1951 | Price | 230—122 |
| 3,016,865 | 1/1962 | Eichenberger | 114—67 |
| 3,075,489 | 1/1963 | Eichenberger | 114—67.1 |
| 3,230,919 | 1/1966 | Crawford | 114—67.1 |

EDGAR W. GEOGHEGAN, *Primary Examiner.*